United States Patent
Majors et al.

(10) Patent No.: US 6,633,786 B1
(45) Date of Patent: Oct. 14, 2003

(54) IRRIGATION SAFETY CONTROL SYSTEM

(75) Inventors: Mark M. Majors, 4818 Marlborough Dr., Albany, GA (US) 31707; Anthony B. Deese, Oakfield, GA (US)

(73) Assignee: Mark M. Majors, Albany, GA (US)

(*) Notice: Subject to any disclaimer, the term of this patent is extended or adjusted under 35 U.S.C. 154(b) by 0 days.

(21) Appl. No.: 09/565,996

(22) Filed: May 6, 2000

Related U.S. Application Data

(60) Provisional application No. 60/133,215, filed on May 7, 1999.

(51) Int. Cl.⁷ .................................................. G05B 9/02
(52) U.S. Cl. ............................ 700/79; 700/284; 239/70
(58) Field of Search .......................... 700/14, 284, 21, 700/79, 282–283; 239/63–64, 67, 69, 70

(56) References Cited

U.S. PATENT DOCUMENTS

| | | | |
|---|---|---|---|
| 4,146,049 A | | 3/1979 | Kruse et al. |
| 4,185,650 A | | 1/1980 | Neves et al. |
| 4,209,131 A | | 6/1980 | Barash et al. |
| 4,626,984 A | | 12/1986 | Unruh et al. |
| 4,760,547 A | | 7/1988 | Duxbury |
| 5,333,785 A | | 8/1994 | Dodds et al. |
| 5,465,904 A | * | 11/1995 | Vaello ........................ 239/69 |
| 5,479,338 A | * | 12/1995 | Ericksen et al. .............. 700/16 |
| 5,638,046 A | | 6/1997 | Malinowski |
| 5,870,302 A | * | 2/1999 | Oliver .......................... 700/11 |
| 5,921,280 A | * | 7/1999 | Ericksen et al. ........ 137/624.11 |
| 6,259,970 B1 | * | 7/2001 | Brundisini .................. 700/284 |
| 6,298,285 B1 | * | 10/2001 | Addink et al. .............. 700/284 |
| 6,337,635 B1 | * | 1/2002 | Ericksen et al. ....... 340/825.69 |
| 6,337,971 B1 | * | 1/2002 | Abts .......................... 455/31.1 |

OTHER PUBLICATIONS

Brochure, Linear's new mid–range wireless., Linear, 2055 Corte Del Nogal, Carlsbad, CA 92009.
Installation Instructions, XT–4, Linear Corporation, 1997.

* cited by examiner

*Primary Examiner*—John Follansbee
*Assistant Examiner*—Ronald D Hartman, Jr.
(74) *Attorney, Agent, or Firm*—Brian D. Bellamy

(57) ABSTRACT

An safety control system especially useful for controlling the irrigation of crops. The system includes a transmitter having an extended range over two miles. A repeat cycle timer provides a repetitive time delayed input signal to the transmitter which transmits a signal while an irrigation system is operational. A receiver for receives the signal from the transmitter, and a time delay relay latches upon receipt of the signal by the receiver to close a circuit and provide power to a pump unit for a fixed amount of time. If the time delay relay times out without receiving a signal from the transmitter, the irrigation pump unit is shut off.

9 Claims, 4 Drawing Sheets

IRRIGATION SAFETY CONTROL SYSTEM

This application claims benefit of provisional application No. 60/133,215 filed May 7, 1999.

BACKGROUND OF THE INVENTION

This invention relates to safety shut-off systems for agricultural irrigation systems, and, more particularly, to an improved wireless safety shut-off system that is reliably operable over an extended range of several miles.

In irrigation systems used in agricultural applications, a typical irrigation system consists of an electrically powered pivot system that circles a field comprising an agricultural crop. The irrigation system further includes a pumping unit that is usually a distance of several thousand feet or even a few miles from the pivot system. To avoid costly damage and wasted resources, the pivot system and pump unit has an automatic shut-off that is triggered by a loss in water pressure, a burn out of underground electrical lines, or a pipe breakage between the pump unit and the pivot system. Malfunctions of the drive motor on the pivot system tower or misalignment of the pivot system could also trigger an automatic shut-off of the pivot system and the pump unit.

In the conditions described, the result could be costly if the pivot system and the pump unit did not shut down properly. For instance, water could run in one place which would result in the system not restarting and could cause the field to erode and damage the crop and hamper harvesting. If an underground pipe broke, a large hole could form in the field that would require costly repairs. If the system was being used to spray nitrogen and the system kept watering, but the system stopped in one place, the nitrogen could harm the crop. Further, a stalled system could cause wastefulness in the use of water, fuel, and chemicals.

In practice, if a farmer does not have an operational safety on his irrigation system, he must operate his system manually with human supervision of the system's operating condition, or he risks severe damage to his crops. Electricity rates are generally cheaper during off-peak hours. Therefore, the farmer must stay awake and supervise the irrigation system at night to reduce costs by taking advantage of the lowest electricity rates.

In the prior art there are wireless type safety systems that are generally being used for water system control and sewage pump stations. However, these wireless systems are generally expensive because of the cost of materials to provide a reliable safety control system. For example, the cost of materials for a safety control system for one irrigation pivot system and one pumping unit would be a minimum of $4000 using known wireless systems. A system this expensive is generally cost prohibitive to farmers.

Other systems have been proposed that use radio waves for switching loads on and off. The systems include a radio transmitter and receiver and work well, except for two major faults. These prior radio wave wireless systems operated by having a transmitter and receiver in the line of sight of each other only. Further, these prior radio wave systems had a range of less than a mile. These disadvantages or faults cause the known methods of using radio waves for irrigation safety control systems to be impracticable because of the distance between a pivot system and a pumping unit in an irrigation system. Other known wireless systems such as cellular communications systems carry costly periodic charges.

The present invention overcomes the above-mentioned and other disadvantages of the prior art systems with a novel and improved wireless safety shut-off system that is reliably operable over an extended range of several miles.

SUMMARY OF THE INVENTION

The present invention provides a wireless irrigation control safety system having a range of two to four miles by using a transmitter operating at 10 watts and providing a 27.255 MHz frequency digital signal. A receiver is provided for receiving said digital signal. The extended range transmitter product used by the present invention is also used in the home security industry. However, this product and receiver did not prove to be very dependable for use in an irrigation control safety system without further improvement. In the known applications using the extended range transmitter and receiver disclosed herein, the transmitter sends one signal to the receiver. If the receiver does not recognize or receive the signal, nothing happens. Experiments found the receiver would fail to receive a signal about 10% of the time, which is an unacceptable fault rate for a critical function such as irrigation system safety control.

In the present invention, a signal is sent every 30 seconds from the transmitter to the receiver. The signal received from the transmitter causes the system to continue running. The signal is used at the receiver to latch a relay in the made position (pump on). This relay starts timing off at an adjustable rate, for example 100 seconds, when a signal is received from the transmitter by the receiver. Every time a signal is sent from the transmitter, the latch relay starts back at timing off at 100 seconds. This latch relay with time delay allows the receiver to miss three signals from the transmitter before the system will safety-off.

Therefore, it is an object of the invention to provide an inexpensive and simple wireless safety shut-off system for agricultural crop irrigation systems.

It is another object of the invention to provide a wireless safety shut-off system that is very reliable.

It is yet another object of the invention is to provide a wireless safety shut-off system having a range of at least two miles.

Still a further object of the invention is to provide a wireless safety shut-off system for agricultural crop irrigation systems that may be packaged and marketed for others to install in the quantity required by the user.

And another object of the invention is to provide a means to replace old safety wiring in agricultural irrigation systems with a reliable wireless safety shut-off system.

The above and other objects, features and advantages of this invention will become more apparent from the following detailed description, when considered in connection with the accompanying drawings.

DETAILED DESCRIPTION

Figure 1:
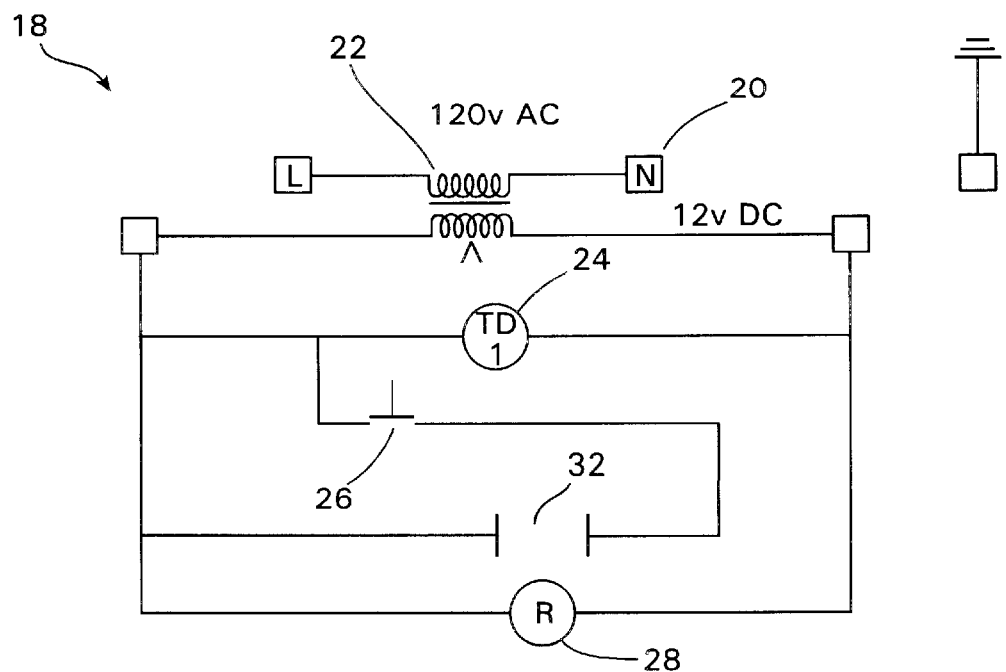
FIG. 1 is a schematic view of the receiver panel of the present invention.
Figure 1A:
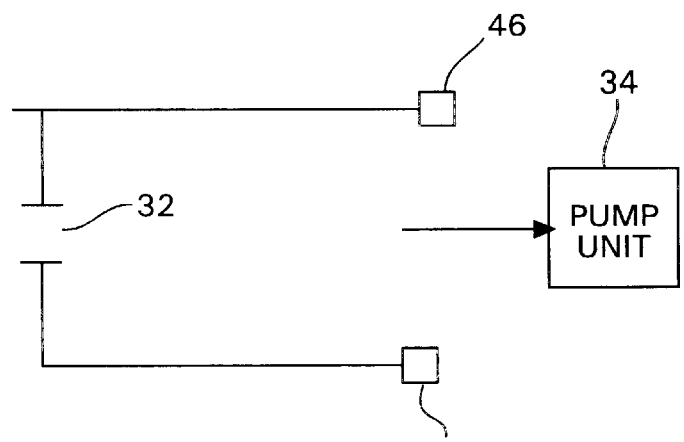
FIG. 1a is a schematic view of the relay output of the receiver contained within the receiver panel of FIG. 1.
Figure 2:
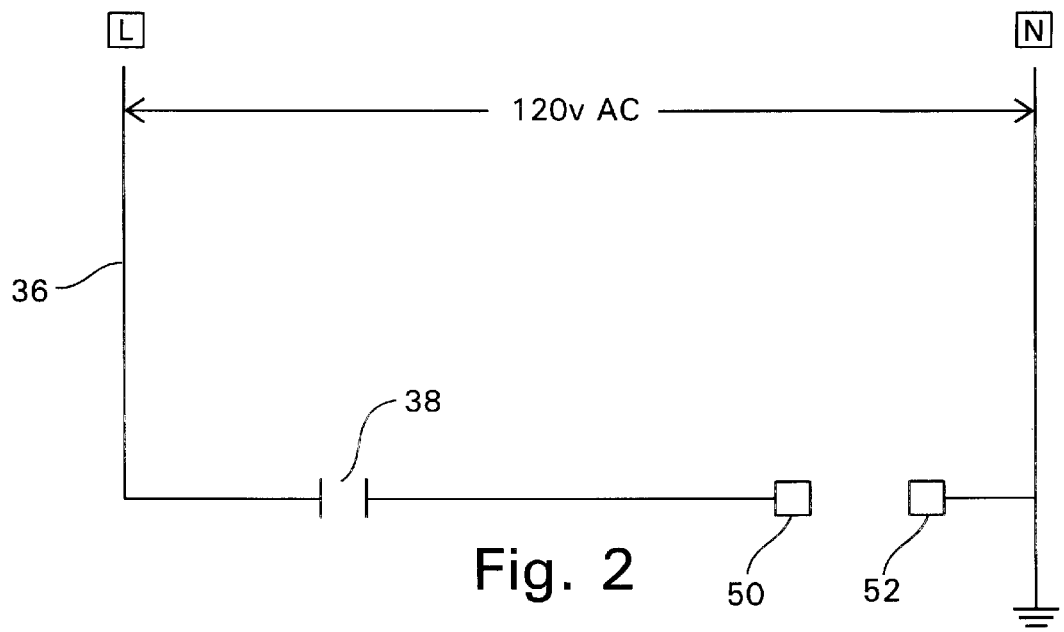
FIG. 2 is a schematic view of a typical irrigation system safety circuit.

FIG. 1 is a receiver panel unit 18 for the wireless safety control system. The receiver panel unit includes a multi-tap hook up terminal 20 for connecting a 120-volt AC power source or a 12-volt DC power source. All of the relays connected to the panel operate on 12-volt DC. Thus, a 120-volt AC to 12-volt DC transformer 22 is installed in each switch or panel to convert power provided at 120-volt AC to 12-volt DC so that the user can hook up to either power source without further action. The above features and others make the safety shut-off system herein one that may be packaged and marketed for others to install.

A time delay off relay 24 is connected to the 12-volt DC source and a switch 26 is provided to initiate contact with the relay 24. The signal received by a receiver 28 causes the time delay relay 24 to latch an internal solid state latching relay in the made position which causes the pump unit 34 to become and remain activated. Upon latching, the time delay relay 24 starts timing off at an adjustable rate. One-hundred seconds would be a suitable time delay for the relay 24 to time off if a signal is not received by the time delay relay start switch 26. When a subsequent signal is received from a transmitter 30 by the switch 26, the relay 24 resets and begins timing again for one-hundred seconds. The one-hundred second time delay permits the system to miss receiving three consecutive signals from the transmitter 30 before the relay 24 will safety-off. The delay process and requirement for the system to miss three consecutive signals before latching off creates a very reliable safety system that does not incur false safety-off occurrences. The preferred embodiment of the invention uses a solid state device 24 that includes a latching relay and a time delay relay in one unit 24. The solid state time delay relay 24 operates on 12 volts DC and provides a reliable and cost-effective relay. The time delay relay 24 receives its input from an output relay 32 on the radio frequency receiver 28 that receives a signal from the remote transmitter 30.

The receiver panel unit 18 further includes terminals 46 and 48 that connect to a starter of a pump unit 34 for automatic operation of the pump unit 34 or shut down circuitry of a diesel pump unit 34. Should the receiver 28 not receive a signal from the transmitter 30 in the one-hundred seconds allotted by the time delay relay 24, the receiver panel 18 will provide an output and trigger the shut down of the pump unit 34.

Typically, an irrigation system will include an irrigation control panel 36 located on the pivot system tower near the pivot axis of the pivot system. As shown, the irrigation control panel 36 has a safety circuit 38 with terminals 50 and 52 located on the irrigation control panel 36.

Figure 3:
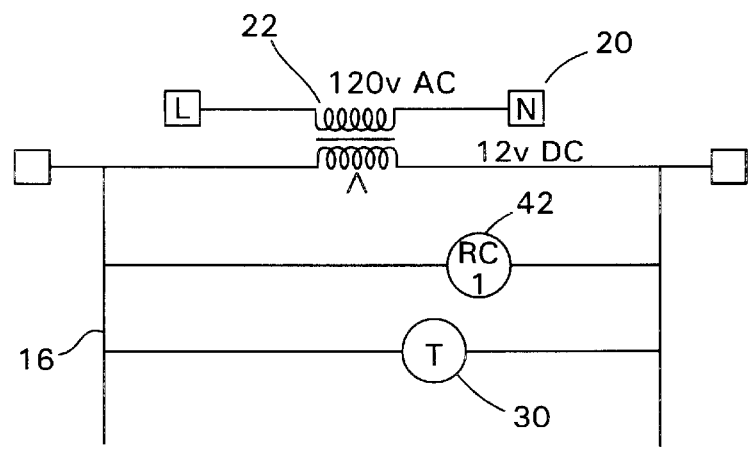
FIG. 3 is a schematic view of the transmitter switch panel of the present invention.
Figure 3A:
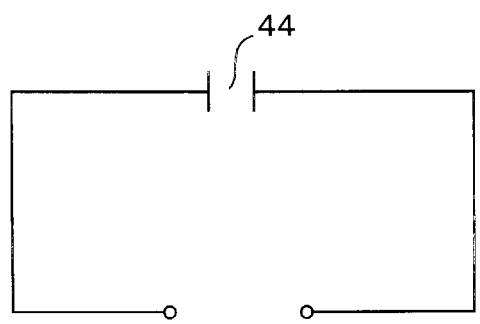
FIG. 3a is a schematic view of the transmitter trigger device contained within the transmitter switch panel of the present invention.

In the present invention, a transmitter switch panel 16 is connected to the irrigation control panel circuitry 36 and is powered by a 120-volt AC current that is converted to 12-volt DC. The transmitter switch panel 16 includes a repeat cycle solid state timer 42, labeled RC1 in FIG. 3, that operates on the 12-volt DC current and repeats its clock cycle at an interval of time. In the preferred embodiment, the repeat cycle timer 42 provides an on input cycle for two seconds and then times for a thirty second delay before it sends another two second on input cycle signal. These time delays may be set according to the desired application settings. The inventor has found that setting the time delay for fifteen seconds rather than thirty may cause transmitter 30 to overheat because of the transmission frequency. As long as the transmitter switch panel 16 is receiving power from the irrigation system control panel 36, the on input signal will be generated periodically by the timer 42 and will be carried by the transmitter switch panel circuitry 16 to triggering relay contacts 44 on the transmitter 30 that is connected to the timer 42. The transmitter triggering contacts 44 are set to the normally open position. Thus, when the on input signal is received by the transmitter 30, the transmitter contacts 44 close and send a latching signal to the receiver 28.

Figure 4:
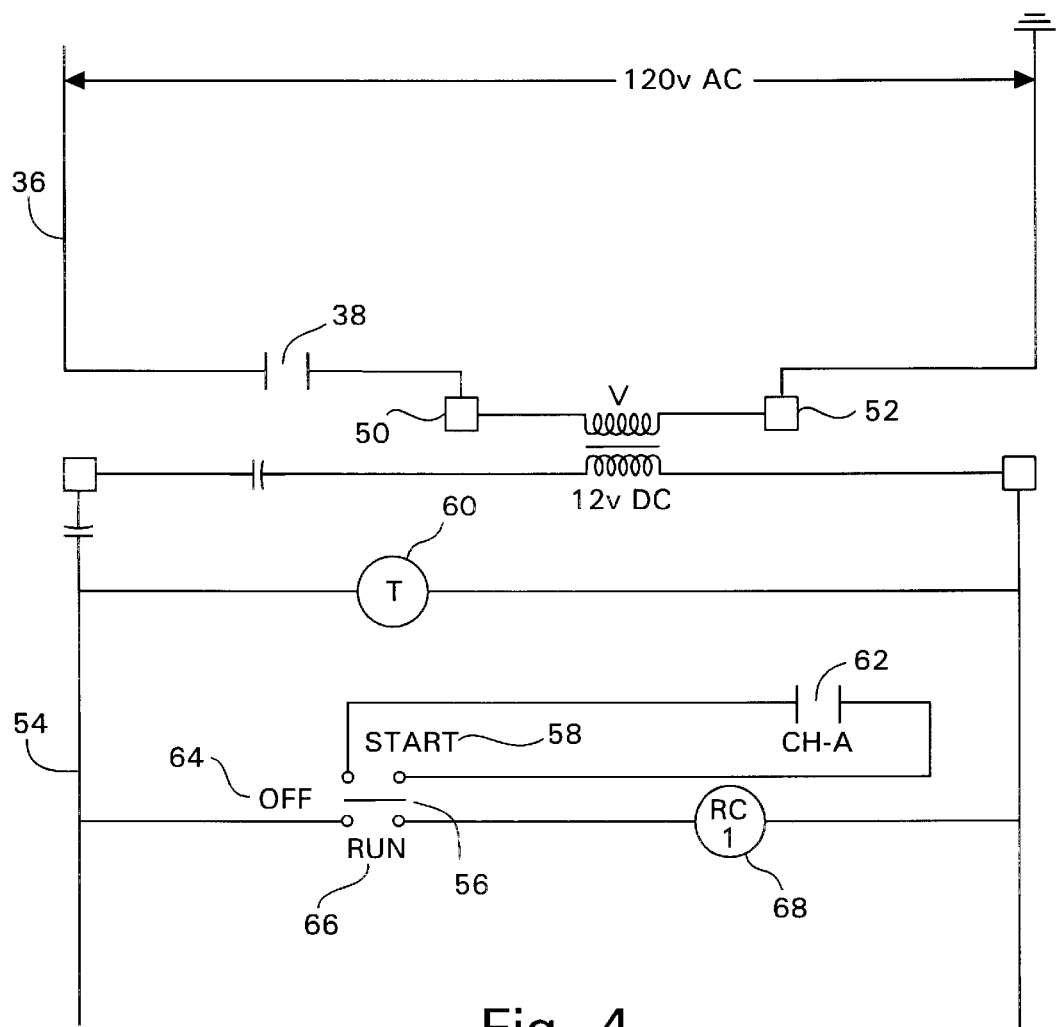
FIGS. 4 and 4a are schematic views of a variation of the wireless safety control system of the present invention.
Figure 4A:
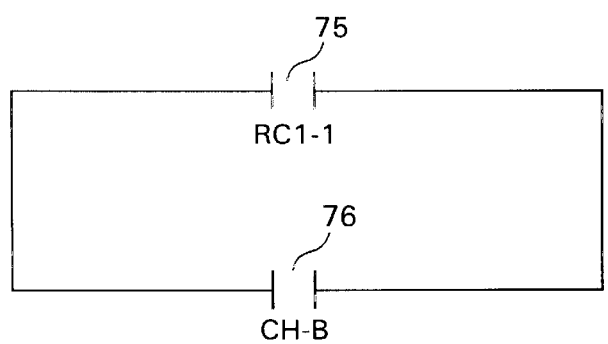
Figure 5:
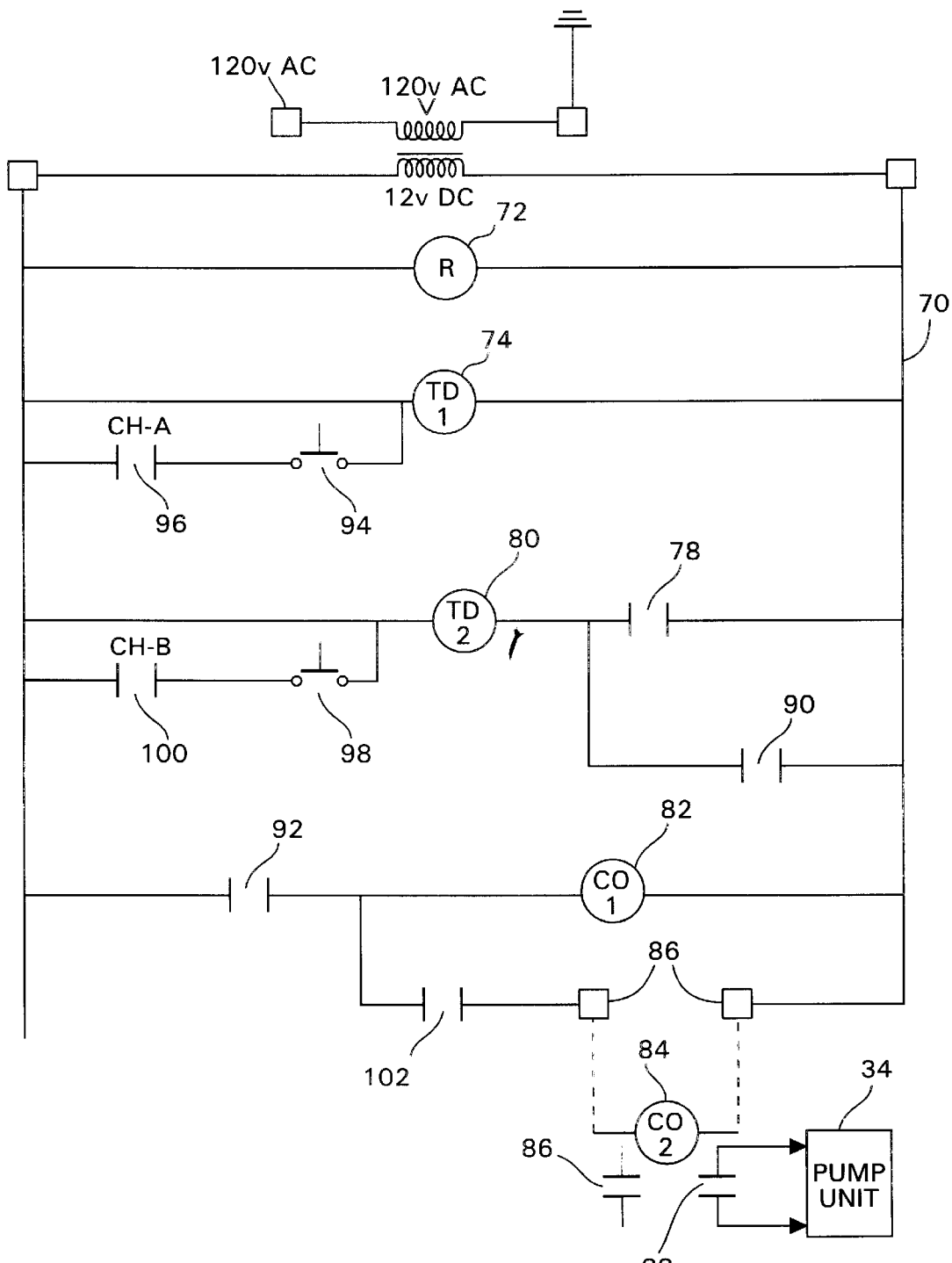
FIG. 5 is a schematic view of a variation of the wireless safety control system of the present invention.

FIGS. 4 and 5 represent a variation of the wireless safety control system of the present invention. The system depicted in FIGS. 4 and 5 provide additional improvements to the basic control system unit shown in FIGS. 1 and 3. In particular, the design illustrated in FIGS. 4 and 5 provides safeguards against false activation signals and isolates the wireless safety system controls from the existing controls on the irrigation system.

The transmitter panel 54 of the irrigation safety control system shown in FIG. 4 includes a three position switch 56. When the switch is turned left to a start position 58, the circuit causes the transmitter 60 to transmit a signal at a first channel selection, channel A, by closing the relay 62, labeled CH-A, on the circuit. In the preferred embodiment of the invention, channel A is set as channel one on the transmitter 60 and receiver 72. The receiver panel circuitry 70 of FIG. 5 is configured such that a signal on channel A must be received for further operation. The switch 56 may be spring loaded when turned to the left start position 58 so that the switch 56 will automatically return to a middle or off position 64 when released. Transmitting the signal on the first channel, channel A, to the receiver 72 latches a twenty (20) second time delay off relay 74, labeled TD1, located in the receiver panel 70 as shown in FIG. 5. This gives the user twenty (20) seconds to turn the three position switch 56 to the right to a third position, which is the run position 66. The time delay of the time delay off relay 74 may be changed according to the users desired specifications.

When the switch 56 is turned to the run position 66 a repeat cycle relay 68, labeled RC1 in FIG. 4, is activated on the transmitter panel 54 causing the auxiliary contacts 75 to close. The repeat cycle relay 68 causes the transmitter 60 to transmit a signal at a second channel selection, channel B, by closing the channel B transmitter contacts 76, labeled as CH-B, on the transmitter panel circuit 54 of FIG. 4. In the preferred embodiment of the invention, channel B is set as channel four on the transmitter 60 and receiver 72. The channel B signal is activated by the repeat cycle relay 68 for two (2) seconds every thirty (30) seconds. The channel B signal cycle is repeated until the irrigation safety control system is turned off or until the safety circuit 38 on the irrigation system pivot control box is kicked out.

As shown in FIG. 5, when the receiver 72 receives a channel A signal and contacts 96 are closed, the internal switch 94 of time delay off relay 74 is activated and gives the user twenty seconds to turn the switch 56 to the run position 66 and cause the channel B signal to be transmitted to the receiver 72. During the twenty seconds that the time delay off relay 74 is energized and latched, the contacts 78 of the time delay relay 74 will be closed. If the channel B signal is not received by the receiver 72, the receiver panel 70 will not provide activation of the irrigation pump unit 34. However, if the channel B signal is received by the receiver 72, then the channel B contacts 100 are closed and an internal switch 98 is activated and latches a one-hundred second time delay off relay 80, labeled as TD2. The time delay of the second time delay off relay 80 may be varied according to the users desired settings and the timing of the repeat cycle relay 68 that causes the transmitter 60 to send a signal to the receiver 72.

Latching the time delay relay 80 activates the control relay 82, labeled as CO1, and closes the contacts 102. As the time delay off relay 80 is timing off for one-hundred seconds, the transmitter 60 is sending channel B signals to the receiver 72 every thirty (30) seconds as regulated by the repeat cycle relay 68. Every time the receiver 72 receives the channel B signal time delay off relay 80 resets at one-hundred seconds and begins timing off again. Time delay off relay 74 will time out at the end of 20 seconds, but time delay relay 80 will stay energized because relay 82 is latching the time delay off relay 80 at contacts 90. Therefore, the receiver 72 will continue to operate until channel B signals are no longer received. The receiver 72 may miss a two signals before the time delay off relay 80 will time out and cause the system shut off. While energized, the relay 82 holds closed a remotely mounted control relay 84, labeled as CO2, through isolated contacts 86 on the control relay 82. Dry contacts 88 on the control relay 84 are used to operate the pump unit 34. When channel B signals stop, the time delay off relay 80 will time out and relays 82 and 84 will de-energize causing the isolated contacts 86 and contacts 88 on the control relays 82 and 84 to open and cause the pumping unit 34 to stop.

In the embodiment disclosed, the receiver 28 is the model XR-1 receiver and receiver 72 is the model XR-4 receiver. Both preferred receivers are manufactured by Linear Corporation. The companion transmitters 30 or 60 are the models XT-1 and XT-4, respectively, also manufactured by Linear Corporation. The XR-1 and XR-4 receivers are known for use in various applications where the receiver receives a signal and performs an operation, but is unique in its present application for an irrigation safety control system that is reliable and uses repetitive latching circuitry. The receiver 28 or 72 is used for the present irrigation safety control system because it provides a means for receiving a digital signal from a companion transmitter 30 or 60 over a distance of two to five miles. Further, the transmitters and receivers described may operate without being within the line of sight of each other. The receiver units include two 8-position switches used to set the units' system codes. More than 65,536 codes are possible for the unit. The code set in the receiver is matched to the code of the companion transmitter. These codes may be preset to match the location as not to interfere with other like safety control systems that are nearby. These codes can be easily changed if there is any conflict.

The XT-1 and XT-4 transmitters are extended range FM frequency transmitters that send a 10 watts, 27.255 MHz, digital encoded, FSK modulated, signal to a companion receiver. The transmitters include switches to set one of more than 65,536 codes to coincide with the code set on the receiver described previously.

The component transmitting panels 16 and 54 and receiver panels 18 and 70 of the present invention are enclosed in weatherproof enclosures. Back plates of aluminum or similar heat conductive material may be provided, especially for the transmitter panel 16 or 54, to act as a heat sink to help cool the panels. Usually the safety system of the present invention will consist of one transmitter panel 16 or 54, which is located at the irrigation system location (i.e., the pivot system tower), and one receiver panel 18 or 70, which is located at the pump unit 34 location. Antennas are provided at each location for transmitting and receiving signals generated by the system. The safety system is expandable to accommodate combinations of multiple pivot systems or pump units, according to the farmer's needs. The safety system can include additional receivers assigned complementary tasks such as activating an alarm in the farmer's home, if it is within range of the transmitter, should the pump units shut down.

From the preceding description of the preferred embodiment of this invention, it will be apparent to those skilled in the art that modifications or alterations may be made therein within the scope and spirit of the invention.

We claim:

1. A safety control system comprising:
    a transmitter;
    a power source for providing power to the transmitter;
    a repeat cycle timer that provides a repetitive input cycle separated by a repetitive time delay, the input cycle causes a circuit to close and cause the transmitter that is powered by the power source to transmit a signal during the input cycle;
    a receiver for receiving the signal from the transmitter;
    a power source for providing power to the receiver;
    a time delay relay that latches upon receipt of the signal by the receiver to close a circuit and provide power to a pump unit for a fixed amount of time, and the time delay relay continues to remain latched upon repetitive receipt of the signal by the receiver thereby continuing to close a circuit and continuing to provide power to the pump unit for a subsequent fixed amount of time.

2. The safety control system of claim 1 in which said transmitter can transmit said signal a range of more than one mile.

3. The safety control system of claim 2 in which said transmitter is not required to be in the line of sight of said receiver.

4. The safety control system of claim 1 in which said transmitter can transmit said signal a range of two to five miles.

5. The safety control system of claim 1 in which said repeat cycle timer provides said repetitive input cycle for about two seconds and said repetitive time delay for about thirty seconds.

6. The safety control system of claim 5 in which said fixed amount of time is about one-hundred seconds.

7. The safety control system of claim 1 in which said fixed amount of time is about one-hundred seconds.

8. A safety control system comprising:
    a transmitter that can transmit a signal a range of more than two miles;
    a power source for providing power to the transmitter;
    a repeat cycle timer that provides a repetitive input cycle for two seconds separated by a repetitive time delay of thirty seconds, the input cycle causes a circuit to close and cause the transmitter that is powered by the power source to transmit the signal during the input cycle;
    a receiver for receiving the signal from the transmitter;
    a power source for providing power to the receiver;
    a time delay relay that latches for one-hundred seconds upon receipt of the signal by the receiver to close a circuit and provide power to a pump unit;
    whereby the time delay relay will time out after one-hundred seconds if the signal is not received by the receiver and power to the pump unit will be removed.

9. A safety control system comprising:
    a transmitter;
    a power source for providing power to the transmitter;
    a three position switch having a start position, an off position, and a run position in which engaging the switch in the start position causes the transmitter to transmit a signal on a first channel and engaging the switch in the run position causes the transmitter to transmit a signal on a second channel;

a repeat cycle timer that provides a repetitive input cycle separated by a repetitive time delay, the input cycle causes a circuit to close and cause the transmitter that is powered by the power source to transmit the signal on the second channel only during the input cycle;

a receiver for receiving the signal on the first channel and the signal on the second channel from the transmitter;

a power source for providing power to the receiver;

a first time delay relay that latches upon receipt of the signal on the first channel by the receiver to close a circuit and provide a first fixed amount of time for the receipt of the signal on the second channel;

a second time delay relay that initially latches only upon receipt of the signal on the second channel by the receiver within the first fixed amount of time and continues to latch upon the additional receipt of the signal on the second channel by the receiver to close a circuit and provide power to a pump unit for a second fixed amount of time.

* * * * *